United States Patent [19]

Martin et al.

[11] 3,937,442
[45] Feb. 10, 1976

[54] GATE VALVE HAVING O-RING SEAL

[75] Inventors: Charles H. Martin, Portland; Steven V. Brewer, Beaverton, both of Oreg.

[73] Assignee: Dillingham Corporation, Honolulu, Hawaii

[22] Filed: Feb. 27, 1975

[21] Appl. No.: 553,586

[52] U.S. Cl. ............... 251/328; 251/360; 277/189
[51] Int. Cl.² ........................................ F16K 3/02
[58] Field of Search .......... 251/328, 360, 357, 358, 251/317; 277/189

[56] References Cited
UNITED STATES PATENTS
| | | | |
|---|---|---|---|
| 2,980,388 | 4/1961 | White | 251/357 X |
| 3,085,784 | 4/1963 | Dumm | 251/357 X |
| 3,207,471 | 9/1965 | Williams | 251/328 |
| 3,384,342 | 5/1968 | Passer | 251/357 |
| 3,654,382 | 4/1972 | Rubright | 277/189 X |

Primary Examiner—Arnold Rosenthal
Attorney, Agent, or Firm—Klarquist, Sparkman, Campbell, Leigh, Hall & Whinston

[57] ABSTRACT

In a knife gate valve, an elastomer O-ring is held in an annular groove in a face of a valve seat by cotter pins having their eyes embedded in the O-ring and their shanks extending through the valve seat and clinched over. The eyes are adhered to the O-ring by vulcanization of the O-ring.

11 Claims, 4 Drawing Figures

U.S. Patent  Feb. 10, 1976  3,937,442
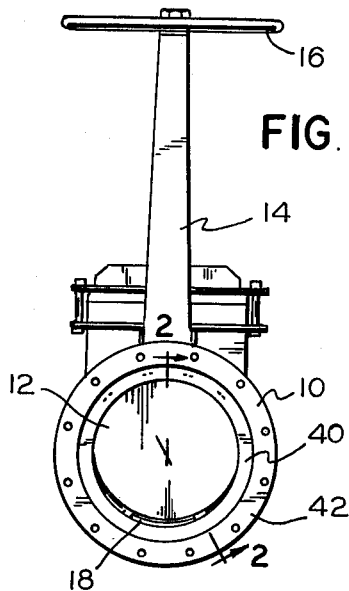
FIG. 1
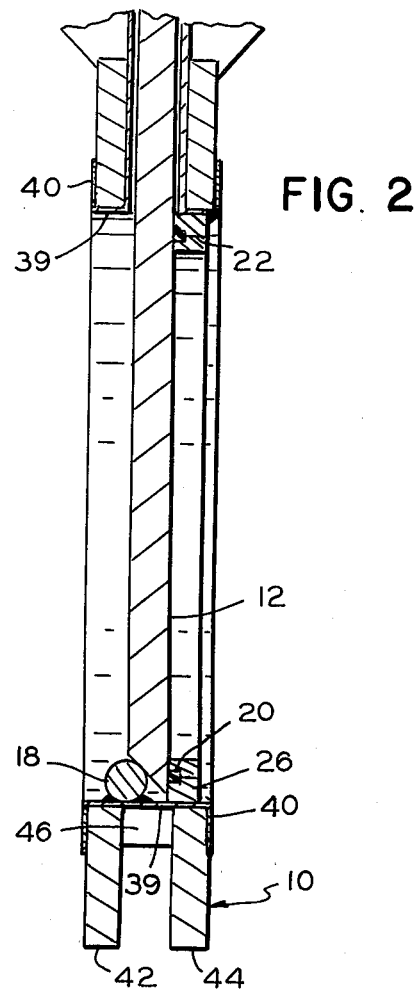
FIG. 2
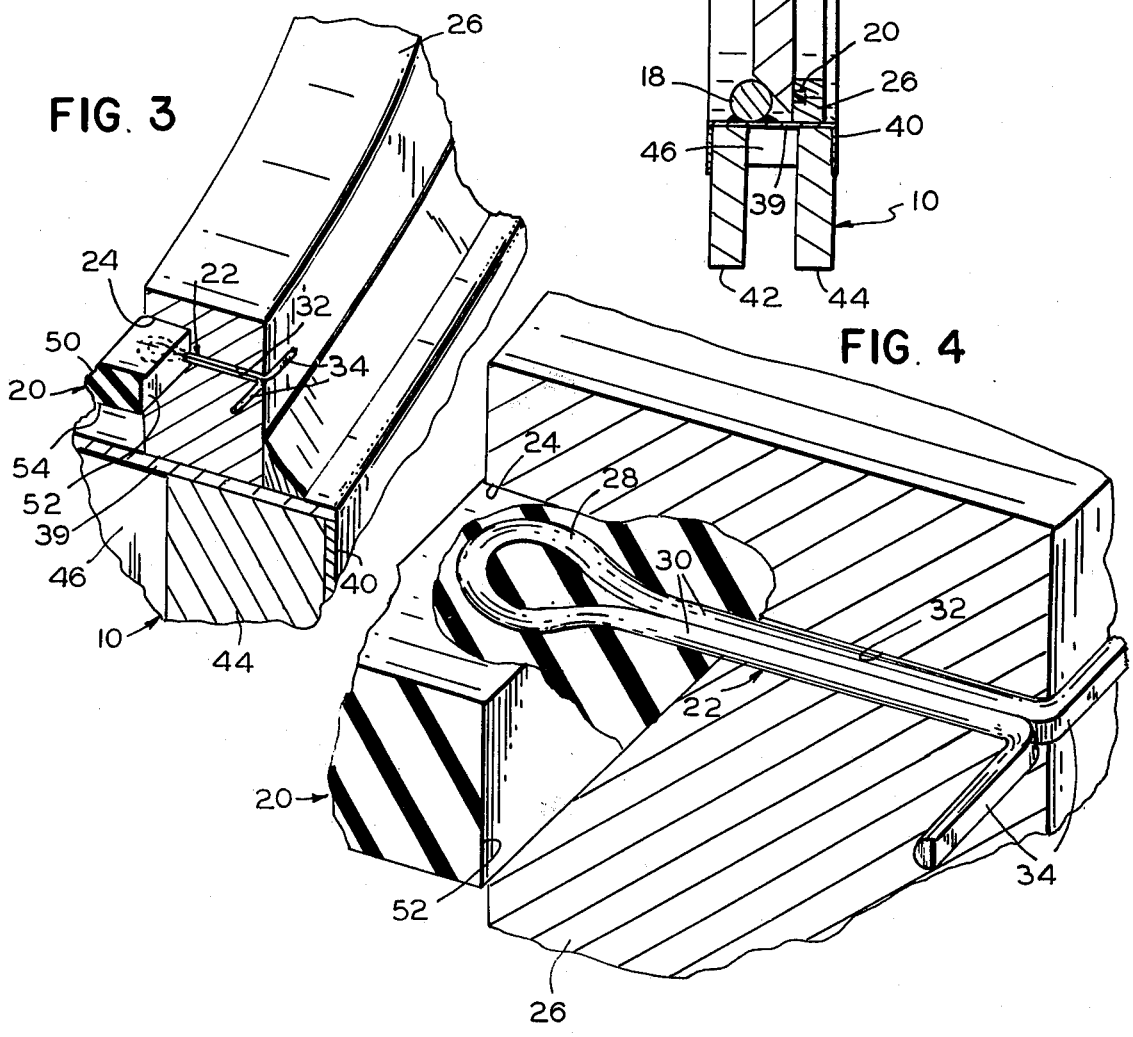
FIG. 3
FIG. 4

GATE VALVE HAVING O-RING SEAL

BACKGROUND OF THE INVENTION

In gate valves for use with very hot liquids such as, for example, boiling wort from a lautering tank, a great difficulty has been encountered in effectively adhesively securing an elastomer O-ring seal to a valve seat, because the high temperatures tend to loosen the bond between the seal and the seat. The problem is compounded when the seat is stainless steel, because the adhesive material does not adhere to stainless steel as readily as it does to mild steel. Thus, adhesive bonds have not been satisfacotry.

Summary of the Invention

A synthetic elastomer O-ring is held in a seated position on a face of a valve seat by fastener elements having head portions embedded in the O-ring and shank portions extending through bores in the valve seat.

It is therefore, an object of the invention to provide an improved gate valve adapted to handle hot liquids.

Another object of the invention is to provide a gate valve having an O-ring sealing member securely held in a sealing position on a stainless steel valve seat member.

A further object of the invention is to provide a gate valve wherein an O-ring is held in position on a valve without any adhesive between the O-ring and the valve seat.

Another object of the invention is to provide a gate valve in which an O-ring is held in seated position on a valve seat by fasteners having heads embedded in the O-ring and shanks slidable in bores in the valve seat.

Another object of the invention is to provide a gate valve in which eyes of cotter pins are embedded in an elastomeric O-ring which is vulcaized to the eyes.

DRAWINGS

FIG. 1 is an end view of an improved gate valve forming one embodiment of the invention;

FIG. 2 is an enlarged, fragmentary sectional view taken along line 2—2 of FIG. 1;

FIG. 3 is an enlarged fragmentary, sectional, perspective view of a portion of the gate valve of FIG. 1; and FIG. 4 is an enlarged, fragmentary, sectional view of a portion of the gate valve of FIG. 1.

Referring now in detail to the drawings, there is shown therein an improved gate valve forming one embodiment of the invention and including a body assembly 10, a knife gate 12, and a yoke 14. A handwheel 16 may be turned to raise and lower the gate between an open position and a closed position, the gate being shown in its closed position in which an arcuate cam 18 presses the gate into sealing engagement with an O-ring 20 (FIGS. 2–4). The O-ring is maintained by a plurality of parallel cotter pins 22 in a seated position and sealingly engaging an arcuate groove 24 in an annular valve seat 26. The O-ring 20 is preferably of a synthetic elastomeric material, one suitable material being an ethylene-propylene diene sold under the trademark "NORDEL". The cotter pins 22 are of stainless steel and have eyes 28 embedded in and vulcanized to the O-ring. That is, the O-rings are molded over the eyes or heads of the cotter pins, and are vulcanized to adhere to the eyes, the material filling the openings in the eyes. Shanks 30 of the cotter pins extend through bores 32 in the seat 26 and are freely slidable therein. End portions 34 of the cotter pins are bent over to secure the O-ring snugly seated in the groove 24, no substantial seating pressure being exerted on the O-rings by the cotter pins.

The gate 12, the annular valve seat 26, the cam 18, and a liner 39 are of stainless steel. The liner 39 is secured in place by a raised weld face 40 at either side of the valve body. Each face is provided by forming a stainless steel weld over the area designated for the face, with the weld extending up against the adjacent edge of the liner to secure it in place. Thereafter, the weld material is ground to provide a proper flat surface. This stainless steel construction is used in a line handling a food product, such as, for example, boiling hot wort from a lautering tank.

When the gate 12 is closed to contain liquid, the gate is pressed against rounded sealing bead portion 50 of the O-ring 20 to press the O-ring against the bottom of the groove 24 to form a very effective seal. The O-ring is molded, and has a substantially rectangular seating portion formed by base 52 and sides 54 which have a slight draft to facilitate molding. That is, the O-ring is slightly wider at its base 52 than it is at the start of the bead 50. The eye of the cotter pin being filled with the elastomeric material of the O-ring, serves as an excellent anchoring head. The eye lies in a plan substantialy parallel to and midway between the sides 54 of the O-ring.

The cotter pins 22 are spaced around the O-ring and their shanks 30 extend parallel to each other and the longitudinal centerline of the valve 26. The eye portions 28 lie circumferentially in the O-ring, as shown best in FIG. 4. Except for the cotter pins, the O-ring is completely free of the groove 24. That is, the O-ring is not adhered to the groove and seals against the walls of the groove merely as the result of pressure on the O-ring.

While the gate valve is very well suited to handle hot fluids, such as, boiling wort, it obviously has high utility in other applications. The cotter pins, with their head or eye portions adhered to the embedding portions of the O-ring, have solved the previously very troublesome problem of holding the O-ring in the groove in the valve seat.

What is claimed is:

1. In a gate valve,
an annular seat member having a plurality of holes therein spaced therearound,
an O-ring,
and a plurality of fastener members having head portions embedded in the O-ring and also having shank portions extending into the holes and secured to the seat member.

2. The gate valve of claim 1 wherein the head portions are eyes and the material of the O-ring fills the eyes.

3. The gate valve of claim 2 wherein the fastener members are cotter pins.

4. The gate valve of claim 3 wherein the cotter pins have shanks slidable in the holes and end portions clinched over.

5. The gate valve of claim 4 wherein the seat member has an annular groove in which the O-ring seats.

6. The gate valve of claim 5 wherein the groove is of a substantially rectangular transverse cross-section, the O-ring having a base portion substantially complementary to and fitting into the groove.

7. The gate valve of claim 3 wherein the holes are parallel to one another.

8. The gate valve of claim 7 wherein the O-ring is of vulcanized material vulcanized to the eyes of the cotter pins.

9. The gate valve of claim 7 wherein the cotter pins have eyes lying in a plane transverse to the longitudinal axis of the O-ring.

10. In a gate valve,
a pair of parallel annular members,
a gate member slidable between the members,
an annular valve seat sealed to one of the annular members and having an annular groove in one face thereof, and a plurality of parallel bores extending from the groove to the opposite face of the valve seat,
an O-ring seated in the groove,
and a plurality of fastener members having heads embedded in the O-ring and shanks slidable in the bores.

11. The gate valve of claim 10 wherein the fastener members are cotter pins.

* * * * *